(12) United States Patent
Fröjdh et al.

(10) Patent No.: US 8,578,228 B2
(45) Date of Patent: Nov. 5, 2013

(54) ERROR RECOVERY FOR RICH MEDIA

(75) Inventors: Per Fröjdh, Stockholm (SE); Clinton Priddle, Stockholm (SE)

(73) Assignee: Telefonaktiebolaget LM Ericcson, Stockholm (SE)

( * ) Notice: Subject to any disclaimer, the term of this patent is extended or adjusted under 35 U.S.C. 154(b) by 863 days.

(21) Appl. No.: 12/305,301

(22) PCT Filed: Jun. 25, 2007

(86) PCT No.: PCT/SE2007/000618
§ 371 (c)(1),
(2), (4) Date: Dec. 17, 2008

(87) PCT Pub. No.: WO2008/020792
PCT Pub. Date: Feb. 21, 2008

(65) Prior Publication Data
US 2009/0282286 A1   Nov. 12, 2009

Related U.S. Application Data

(60) Provisional application No. 60/838,161, filed on Aug. 17, 2006.

(51) Int. Cl.
*G06F 11/00* (2006.01)
(52) U.S. Cl.
USPC .................... 714/746; 375/240.12
(58) Field of Classification Search
USPC ............... 714/746, 748, 751; 370/240.12; 375/240.12
See application file for complete search history.

(56) References Cited

U.S. PATENT DOCUMENTS

| | | | | |
|---|---|---|---|---|
| 6,463,101 | B1 * | 10/2002 | Koto | 375/240.13 |
| 6,587,464 | B1 * | 7/2003 | Brown et al. | 370/394 |
| 6,724,819 | B1 * | 4/2004 | Takaki et al. | 375/240.12 |
| 6,765,963 | B2 * | 7/2004 | Karczewicz et al. | 375/240.03 |
| 7,411,903 | B2 * | 8/2008 | Jang et al. | 370/230 |
| 7,639,924 | B2 * | 12/2009 | Roelens | 386/354 |
| 7,676,722 | B2 * | 3/2010 | Setton et al. | 714/748 |
| 7,706,447 | B2 * | 4/2010 | Karczewicz et al. | 375/240.2 |
| 7,760,990 | B2 * | 7/2010 | Kato | 386/334 |
| 2001/0050685 | A1 | 12/2001 | Simons | |
| 2002/0118295 | A1 | 8/2002 | Karczewicz et al. | |

(Continued)

FOREIGN PATENT DOCUMENTS

| | | |
|---|---|---|
| EP | 0 902 593 A1 | 3/1999 |
| EP | 1 677 547 | 7/2006 |
| WO | 00/56077 A1 | 9/2000 |
| WO | WO 02/054776 | 7/2002 |

OTHER PUBLICATIONS

Karczewicz et al. "The SP and SI Frames Design for H.264/AVC". IEEE. Jul. 2003.*

(Continued)

*Primary Examiner* — Yolanda L Wilson
(74) *Attorney, Agent, or Firm* — Nixon & Vanderhye, PC

(57) ABSTRACT

A media stream comprising rich media scene packets and scene update packets is complemented with a data packet defining an exit point for interrupting rendering rich media of the stream and a scene update packet associated with the data packet and defining an entry point back to rendering rich media of the stream. The exit-entry point pair defines an alternative media rendering route that can be used by user terminals to recover from errors in the media stream.

38 Claims, 6 Drawing Sheets

(56) References Cited

U.S. PATENT DOCUMENTS

| | | | | |
|---|---|---|---|---|
| 2002/0152440 | A1* | 10/2002 | Yona et al. | 714/746 |
| 2003/0086494 | A1* | 5/2003 | Wang et al. | 375/240.12 |
| 2004/0027991 | A1* | 2/2004 | Jang et al. | 370/230 |
| 2004/0114684 | A1 | 6/2004 | Karczewicz et al. | |
| 2005/0099869 | A1* | 5/2005 | Crinon et al. | 365/222 |
| 2005/0152448 | A1* | 7/2005 | Crinon et al. | 375/240.01 |
| 2005/0190834 | A1* | 9/2005 | Wu et al. | 375/240.1 |
| 2005/0198346 | A1* | 9/2005 | Wang et al. | 709/231 |
| 2007/0053445 | A1* | 3/2007 | Schaar et al. | 375/240.28 |
| 2007/0110154 | A1* | 5/2007 | Wang et al. | 375/240.12 |
| 2008/0112485 | A1* | 5/2008 | Adachi et al. | 375/240.12 |

OTHER PUBLICATIONS

International Search Report for PCT/SE2007/000618, mailed Dec. 13, 2007.
Written Opinion of the International Searching Authority for PCT/SE2007/000618, mailed Dec. 13, 2007.
International Preliminary Report on Patentability for PCT/SE2007/000618, dated Aug. 1, 2008.
Karczewicz, M. et al., "The SP-and SI-Frames Design for H.264/AVC", IEEE Transactions on Circuits and Systems for Video Technology, vol. 13, Issue 7, (Jul. 2003), pp. 637-644.
Andersson et al, "Scalable Vector Graphics (SVG) tiny 1.2 Specification", W3C Candidate Recommendation, Aug. 10, 2006.
3GPP SA4 PSM ad-hoc meeting, Tdoc S4-AHP255, MORE Technical Proposal for Dynamic and Interactive Multimedia Scenes (DIMS), Kista, Sweden, Apr. 11-12, 2006.
Berjon, Remote Events for XML (REX) 1.0, W3C Working Draft, Feb. 2, 2006.
RFC 3550, Schulzrinne et al, "RTP: A Transport Protocol for Real-Time Applications", Jul. 2003.
International Standard, ISO/IEC, 14496-50, Information Technology—Coding of Audio-Visual Objects—Part 20: Lightweight Application Scene Representation (LASeR) and Simple Aggregation Format (SAF), Second edition, Dec. 1, 2008.
Supplementary EP Search Report mailed Nov. 8, 2011 in EP application 07748279.2.
Ericsson et al, "DIMS Media-Type and Interaction and Scripting", 3GPP Draft; S4-AHP287, $3^{rd}$ Generation Partnership Project (3GPP), Mobile Competence Centre; 650, Route Des Lucioles, F-06921 Sophia-Antipolis Cedex, France, vol. SA Wg4, No. Sophia Antipolis, France; 20060629, Jun. 29, 2006.
Ericsson et al, "Synchronization and Tune-in", 3GPP Draft, S4-AHP286, $3^{rd}$ Generation Partnership Project (3GPP), Mobile Competence Centre; 650, Route Des Lucioles, F-06921 Sophia-Antipolis Cedex, France, vol. SA Wg4, No. Sophia Antipolis, France; 20060629, Jun. 29, 2006.
Apple Computer et al, "Proposed Initial Text for the 3GPP DIMS File Format", 3GPP Draft; S4-AHP274-DIMS-FF, $3^{rd}$ Generation Partnership Project (3GPP), Mobile Competence Centre; 650, Route Des Lucioles, F-06921 Sophia-Antipolis Cedex, France, vol. SA Wg4, No. Sophia Antipolis, France; Jun. 29, 2006.
"Rich Media Environment Technology Landscape Report", 3GPP Draft; OMA-WP-Rich-Media-Environment-20060406-D, $3^{rd}$ Generation Partnership Project (3GPP), Mobile Competence Centre; 650, Route Des Lucioles, F-06921 Sophia-Antipolis Cedex, France, vol. SA Wg4, No. Dallas, May 7, 2006.
3GPP; $3^{rd}$ Generation Partnership Project; Technical Specification Group Services and System Aspects; Dynamic and Interactive Multimedia Scenes; (Release 7); 3GPP Draft, DIMS Specification, Mobile Competence Centre; 650, Route Des Lucioles, F-06921 Sophia-Antipolis Cedex, France, vol. SA Wg4, No. Athens, Greece; Oct. 31, 2006.
Fukunaga et al, "Error Resilient Video Coding by Dynamic Replacing of Reference Pictures", Global Telecommunications Conference, 1996, Globecom '96, Communications; The Key to Global Prosperity London, UK, Nov. 18-22, 1996, New York, NY, USA, IEEE, US, vol. 3, Nov. 18, 1996, pp. 1503-1508.
Setlur et al, "More: A Mobile Open Rich Media Environment", IEEE International Conference on Multimedia and Expo, XX, XX, Jul. 9, 2009, pp. 1-4.
Dufourd, "LASeR and SAF editor's study", 74, MPEG Meeting, Oct. 17-21, 2005, Nice, (Motion Pictureexpert Group or ISO/IEC JTC1/SC29/WG11), No. M12503, Oct. 12, 2005.
Karczewicz et al, "The SP- and SI-Frames Design for H.264/AVC", IEEEE Transactions on Circuits and Systems for Video Technology, vol. 13, No. 7, Jul. 2003, pp. 637-644.

\* cited by examiner

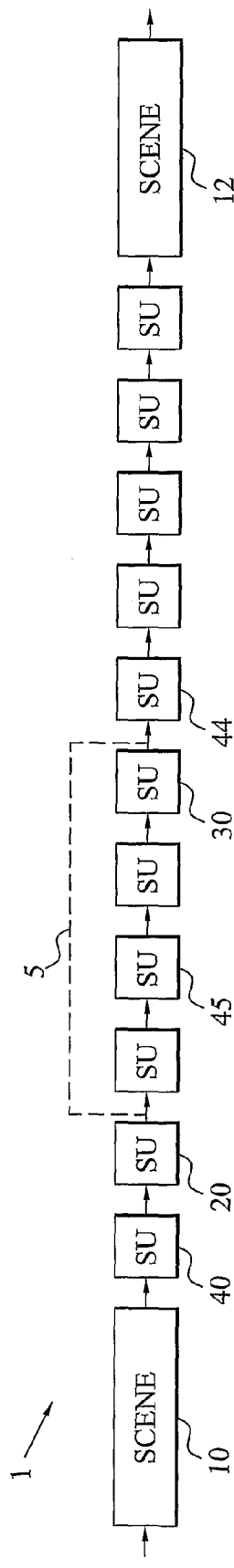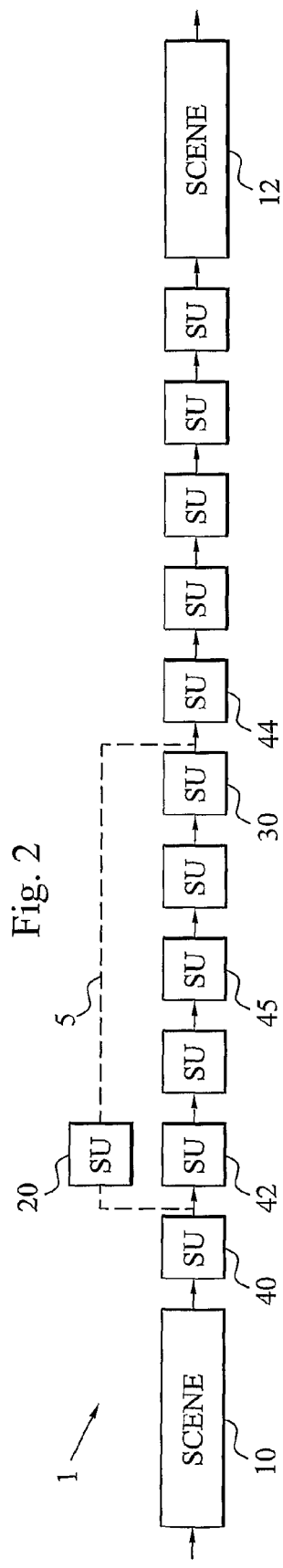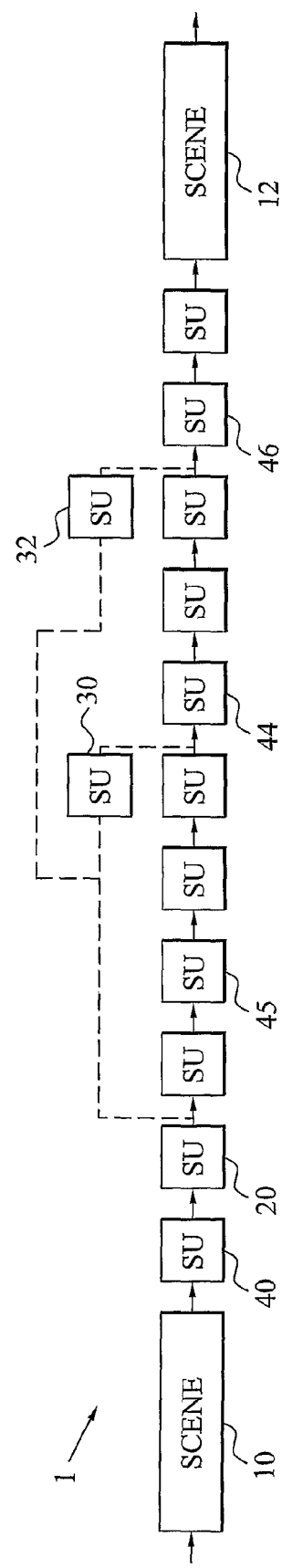

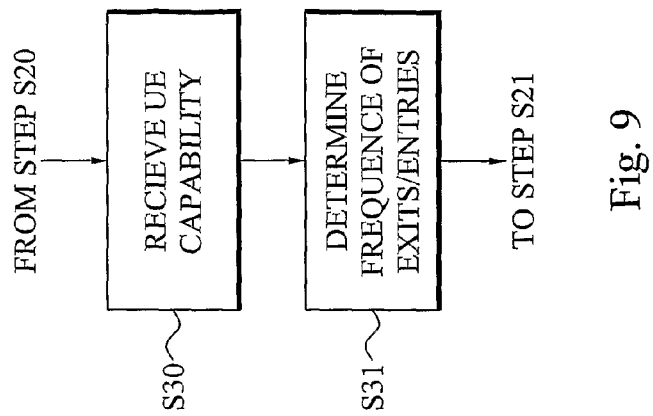
Fig. 9
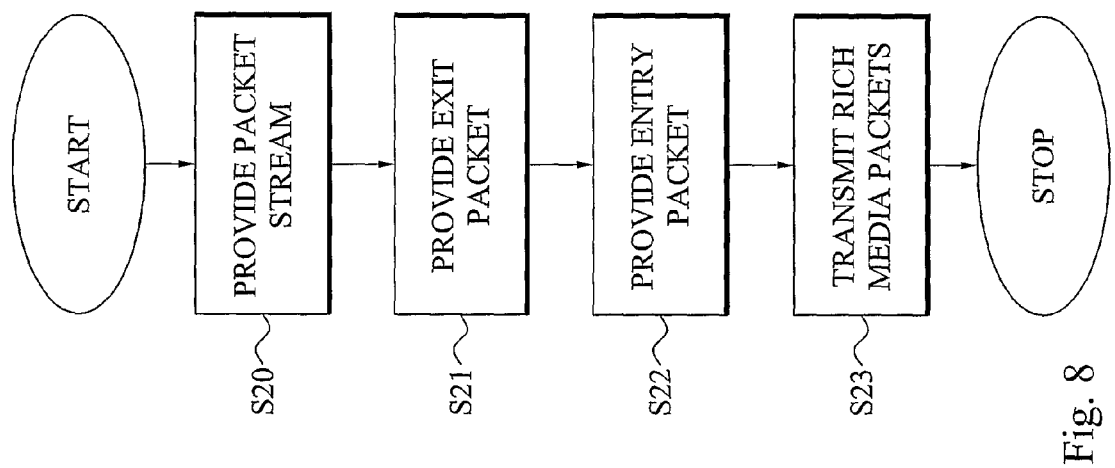
Fig. 8
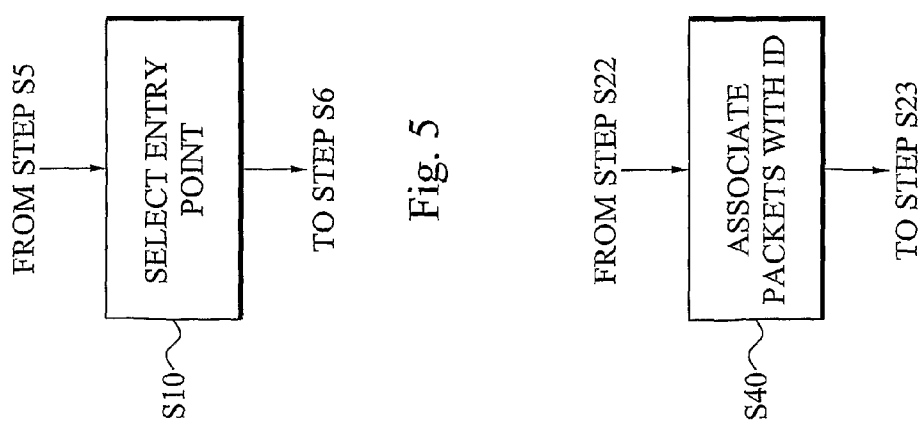
Fig. 5
Fig. 10

ERROR RECOVERY FOR RICH MEDIA

This application is the U.S. national phase of International Application No. PCT/SE2007/000618, filed 25 Jun. 2007, which designated the U.S. and claims the benefit of U.S. Provisional Application No. 60/838,161, filed 17 Aug. 2006, the entire contents of each of which are hereby incorporated by reference.

TECHNICAL FIELD

The technology disclosed herein generally relates to rich media management, and in particular to generation and usage of a rich media stream comprising error recovery functionality.

BACKGROUND

Scalable Vector Graphics (SVG) is an Extensible Markup Language (XML) based language for representation of static and dynamic vector graphics. SVG is vector-based which means that the content is not made for certain screen resolutions but can be easily scaled. SVG is standardized by the World Wide Web Consortium (W3C). The mobile profile of SVG version 1.1 was adopted by 3GPP Release 5 and it is today supported by roughly 100 million mobile handsets.

SVG Tiny 1.2 [1] is a more powerful version of SVG that is specifically designed for mobile devices and terminals. It is currently a W3C candidate recommendation and has been adopted by 3GPP Release 6. Support for a variety of new multimedia features, including full control of audio and video, is included along with micro Document Object Model (μDOM) and scripting.

In addition to being a media type for vector graphics, SVG can also be used as a scene description language, where a scene can be composed temporally as well as spatially. In fact, SVG Tiny 1.2 is currently under consideration as the presentation format for the 3GPP work item on Dynamic and Interactive Multimedia Scenes (DIMS) as well as for the Open Mobile Alliance (OMA) work item on Rich-Media Environment (RME). The standardization of DIMS and RME are currently active and it is expected that the work items will produce aligned deliveries. For DIMS (and also for RME), the main competing proposals are the Mobile Open Rich media Environment (MORE) [2] building on technologies from W3C and the Lightweight Application Scene Representation (LASeR) [3] standardized by MPEG. Both use SVG Tiny 1.2 as basis.

DIMS (RME) content, as opposed to pure SVG content, can be streamed using the Real-time Transport Protocol (RTP) [4]. The rendered SVG document is referred to as an SVG scene and will typically be updated with smaller scene updates. MORE and LASeR specify how SVG scenes can be transported over RTP. The mechanisms for scene updates are conceptually similar, albeit not identical. LASeR specifies its own mechanisms, whereas MORE uses Remote Events for XML (REX) [5] by W3C.

The ability to recover from errors is essential, especially when unreliable protocols such as RTP are used. Random Access Points (RAPs) are defined in both the MORE and LASeR proposals for this purpose. When an error occurs, one must wait for the next RAP to recover. This RAP is decoded the same way as if one was tuning in for the first time. Everything from the old scene is deleted, and a new tune-in is performed.

The prior art technique of using a RAP to recover from an error is a way of discarding all data and starting again from scratch. All media from before the RAP is destroyed and reinitialized, and all interactivity is lost. This means that even a small error will cause a complete re-initialization of the client.

In order to rely on recovery by using RAPs, it is also necessary to include RAPs frequently in the bit stream. As RAPs typically are large compared to differential scene information, there will be a substantial overhead of redundant data.

Complete re-initialization of a client causes a severe negative impact on user experience. A pause in the audio and video is almost inevitable and the client will revert to default settings.

SUMMARY

There is, thus, a need for an error recovery function that does not have the drawbacks of prior art methods in terms of the user-perceived delay in awaiting a new RAP, complete re-initialization of scene rendering and substantial overhead due to frequent RAPs.

The technology disclosed herein overcomes these and other drawbacks of the prior art arrangements.

It is a general object of the technology disclosed herein to provide a rich media packet management.

It is a particular object of the technology disclosed herein to provide a rich media packet management that provides an error recovery possibility in a rich media packet stream.

These and other objects are met by the technology disclosed herein as defined by the accompanying patent claims.

Briefly, the technology disclosed herein involves provision and management of a rich media stream of so-called rich media scene packets (sometimes denoted random access points in the art) and scene update packets. At least one data packet in the stream or such a data packet transmitted on a separate error recovery channel is designed to define an exit point for temporarily interrupting rendering rich media of the stream. This exit point further has at least one associated entry point back to rendering rich media of the stream. At least one scene update packet in the stream or on the separate recovery channel is designed to define this associated entry point. The exit-entry point pair or group together provides at least one alternative route a media player can take when rendering rich media of the stream in the case an error occurs in the reception or decoding of a rich media packet positioned between the exit and entry points in the stream.

Thus, upon identification of an incorrectly received or decoded packet, a user terminal identifies a previously received exit point defining packet. This identified packet is preferably a rich media packet included in or at least associated with the stream. The packet is more preferably a scene update packet. Once that packet has been identified, the terminal searches for an associated entry point defining scene update packet based on the identified exit point packet. The rendering of rich media of the stream then continues up to the exit point, where the scene or scene update of the exit point packet is rendered followed by the scene update of the associated entry point packet. Rendering then continues with the rich media packets following the entry point in the stream. The rendering therefore takes an alternative route that bypasses the error in the stream between the exit and entry points.

The technology disclosed herein allows for a seamless recovery of stream errors without any interruptions due to awaiting a next random access point in the stream.

The technology disclosed herein teaches a method of error recovery, a method of generating a rich media stream, a user terminal, a media provider and an improved rich media packet stream.

The technology disclosed herein together with further objects and advantages thereof, may best be understood by making reference to the following description taken together with the accompanying drawings, in which:

FIG. 2 is a schematic illustration of a portion of a rich media stream provided with recovery point according to an embodiment of the technology disclosed herein;

FIG. 3 is a schematic illustration of a portion of a rich media stream provided with recovery point according to another embodiment of the technology disclosed herein;

FIG. 5 is a flow diagram illustrating an additional step of the error recovering method of FIG. 1;

FIG. 6 is a schematic illustration of a portion of a rich media stream provided with recovery point according to a further of the technology disclosed herein;

FIG. 8 is a flow diagram of a method of generating a rich media stream according to the technology disclosed herein;

FIG. 9 is a flow diagram illustrating additional steps of the stream generating method of FIG. 8;

FIG. 10 is a flow diagram illustrating an additional step of the stream generating method of FIG. 8;

DETAILED DESCRIPTION

Figure 1:
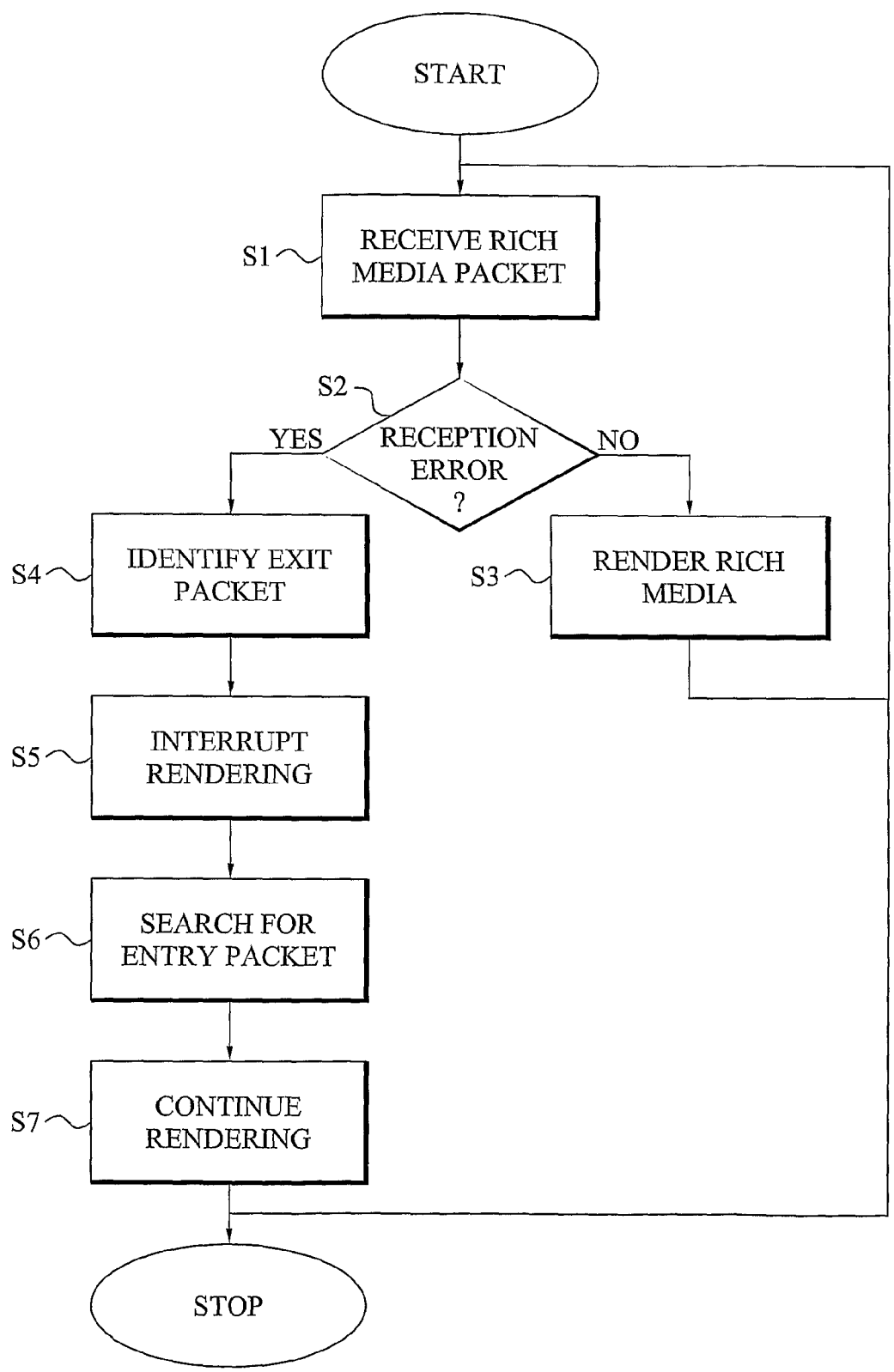
FIG. 1 is a flow diagram of a method of recovering from error during a rich media session according to the technology disclosed herein.

Throughout the drawings, the same reference characters will be used for corresponding or similar elements.

The technology disclosed herein relates to rich media management and in particular to providing and using error recovery functionalities in a packet stream of rich media.

According to the technology disclosed herein rich media relates to media and multimedia content that can be processed and rendered to form different scenes at a display screen of a rendering terminal. Such rich media content include graphics, in particular vector graphics and scalable vector graphics (SVG), static and/or continuous media content. Examples of static content include images and text, while video and audio is regarded as continuous media.

A rich media packet stream of the technology disclosed herein comprises multiple data packets comprising rich media data. Generally, such packets could, according to the technology disclosed herein, be defined into two different classes. Firstly, a data packet, or possibly multiple sequential packets, can contain a so-called random access point (RAP) or complete scene. The content of the data packet(s) describes the spatial organization of scene elements, the temporal organization of scene elements, synchronization information and any interaction among the elements. Thus, this information is enough for rendering a complete scene without the usage of any information of previous rich media packets. This means that a client can use the scene-containing packet for initializing the presentation and layout of the rich media. In the prior art, initiation of media rendering and recovery of previous reception and decoding error is limited to these so-called RAPs.

The vast majority of the packet stream comprises scene update packets comprising incremental updates to a scene defined by a previous RAP or a scene representable by rendering a previous RAP and a number of previous scene update packets. The scene update packets define operations such as scene element addition, scene element deletion, scene element replacement, scene element attribute updates and new scene operations.

Sometimes the expressions complete Extensible Markup Language (XML) document and XML document updates are used for denoting scenes and scene updates, respectively. In the following application, the expressions scenes and scene updates will consistently be employed. However, this encompasses alternative denotations such as complete XML documents and document updates.

The data packets of a rich media stream of the technology disclosed herein therefore comprises data of a complete scene or data of a scene update. It is anticipated by the technology disclosed herein that the packets may also include other information relating to the processing of the rich media, such as media synchronization, metadata and hint tracks.

FIG. 1 is a flow diagram illustrating a method of recovering from an error in a stream of rich media packets according to the technology disclosed herein. Some of the packets include rich media scenes while the remaining, major portion of the packets in the stream comprises scene updates. The method starts in step S1, where rich media packets are received by a user terminal. The rich media packets originate from a media provider and are forwarded to the terminal through a communication network, preferably a wireless radio-based network. The data packets can be provided to the terminal through unicast file download, e.g. over Hypertext Transfer Protocol (HTTP), broadcast file download, e.g. over File Delivery over Unidirectional Transport (FLUTE) or progressive download, e.g. over HTTP. Alternatively, the media provider provides the data packets in the form of unicast, multicast or broadcast streaming, e.g. using Real-time Transport Protocol (RTP), to the user terminal.

The received rich media packets are processed in the terminal according to techniques well-known in the art, including storing in a media or jitter buffer, decoding, etc. The different media packets are checked for detection whether the packet was incorrectly received by the terminal in a next step S2. Thus, it is determined whether the data packet can be successfully rendered by a media player or whether some error has occurred during the transmission or processing of the rich media packet.

In the case of successful reception, the rich media content of the packet is forwarded, possibly after media buffering and/or processing, to a media player where the data is rendered in step S3 to display a scene on a display screen connected to the media player. This rendering step S3 can be performed using the rich media data together with previously received media data in the case of a scene update packet. Alternatively, the rendered scene is obtainable by rendering only the rich media in the case of the complete scene packet (RAP). The method then returns to step S1. Thus, the loop consisting of steps S1, S2 and S3 is preferably conducted through the current media session until a session tear down or until an incorrectly received or processed scene packet or scene update packet is detected at step S2.

If such an error in reception or processing occurs, the method continues from step S2 to step S4. Step S4 identifies a previously received data packet stored in a data buffer at the terminal. Thus, this exit point defining packet is a more previous media point in the stream as compared to the erroneous data packet. The identified data packet defines an exit point for interrupting rendering rich media packets of the stream. Thus, the packet signals an exit point from the stream directing the rich media rendering in an alternative route instead of continuing to the next rich media packet in the stream. As a consequence, once the media player reaches a position in the media stream which corresponds to the exit point, the rendering of the rich media stream is interrupted in step S5 in the sense that an alternative route in the media rendering is instead taken. This alternative route is defined by the exit point packet and its associated entry point packet, which provides an entry back to rendering rich media packets of the stream.

The identified exit point defining packet is preferably a previously received rich media packet, i.e. a previously received a complete scene packet or a scene update packet. The packet is more preferably a scene update packet. However, in particular embodiments of the technology disclosed herein the exit point defining packet can be a dedicated exit point packet that is included in the stream or transmitted using a separate error recovery channel. Thus, in such a case the packet is not regarded as a regular media scene packet or scene update packet.

The terminal therefore uses the previously received (scene update) packet identified in step S4 to search among newly received data packets for a scene update packet defining an entry point back to rendering rich media packets of the stream in step S6.

In a typical implementation, the data packet defining the exit point has a defined association or state identifier. In such a case, the identification of the exit point defining packet in step S4 can be performed based on the association identifier. The identifier can be signaled in the header of the data packets, such as in a RTP payload header, or can be a parameter associated with a sample in the case of a 3GP file.

A first embodiment of the identifier implementation assigns association identifiers to only the data packets defining rendering exit and entry points according to the technology disclosed herein. This means that the terminal can easily identify an exit or entry point defining packet by the presence of such an association identifier. In a second embodiment, each rich media packet comprises a given association identifier. The exit and entry point carrying packets can then be identified by the particular values of the identifiers. For example, normal scene packets and scene update packets could have assigned identifiers of a pre-defined value, such as zero. The packets defining an exit or entry point according to the technology disclosed herein could then use different other identifier values, such as non-zero values. This allows for an easy identification and discrimination of rich media packets.

A preferred embodiment of the technology disclosed herein uses the same association identifier for a rich media packet defining an entry point as the (rich media) packet defining the exit point associated with the entry point. In such a case, the association identifier of a previously received scene update packet defining an exit point can be used in searching for a scene update packet defining an associated entry point in step S6.

The entry point defining scene update packet can be transmitted among the other rich media packets in the stream. In such a case, the terminal simply investigates the received media packets to identify, preferably based on the above-described association identifier, a scene update packet carrying the entry point back to rendering rich media of the stream. Alternatively, the entry point defining scene update packet is transmitted on a separate error correction channel. The terminal could then connect, upon detection of a reception error in step S2, to this error correction channel to await a scene update packet defining an entry point associated with the exit point identified in step S4. Once the correct scene update packet has been received, the terminal could disconnect from the correction channel. Instead of selectively connecting to and disconnecting from the correction channel, the terminal can listen to this channel in parallel with the media channel on which it receives the rich media packets. This will typically not impose any significant data processing onto the terminal, as the error correction channel will carry vastly less data than the media channel and would then only carry exit point and/or entry point defining scene update packets. In addition, the terminal typically ignores the data transmitted on the alternative channel unless a stream error arises.

Once the terminal has identified the entry point defining scene update packet in step S6, the method continues to step S7. This step S7 continues the rendering of rich media packets of the stream following the entry point in the identified scene update packet. The method therefore typically returns to step S1, where new rich media packets are received and subsequently rendered.

The exit-entry point pair of the present invention defines an alternative route through rendering the rich media packets that can be taken once the normal route becomes blocked by an incorrectly received rich media packet. In the prior art, upon incorrect packet reception or processing, the rendering of the rich media was continued up to the erroneous rich media packet and had then to be put on hold until a rich media packet comprising a complete scene, i.e. RAP, was received by the terminal. Then a complete re-initialization of the media player was necessary.

The technology disclosed herein does not have to await the arrival of such a RAP. Instead the exit-entry point pair guides the media player through an alternative path that skips one or more rich media packets, including the incorrectly received rich media packet. This means that the media rendering does not have to pause but can continue in a smooth, uninterrupted way. By careful selection of the exit and entry points, a user will not notice that an alternative rendering route has been taken or the change will be only marginally noticeable.

FIG. 2 is a schematic overview of an embodiment of a stream 1 of rich media packets 10, 12, 20, 30, 40, 44, 45. The figure illustrates that the stream 1 comprises packets 10, 12 comprising complete rich media streams and packets 20, 30, 40, 44, 45 carrying scene updates. As is schematically illustrated in the figure, the size (in terms of number of bits) of a complete scene packet 10, 12 is comparatively much larger than the size of a scene update packet 20, 30, 40, 44, 45.

In a typical scenario a user terminal first receives a rich media packet 10 comprising an initial scene followed by several update packets 40, 20. The received packets 10, 20, 40 are typically temporarily buffered before being decoded and rendered to mitigate jitter problems during transmission of the packets. In this embodiment, the terminal investigates the received packets 10, 20, 40 to determine whether any of them defines a so-called exit point 20. This packet identification is preferably performed at least partly based on an association identifier assigned to the exit point defining packet 20. Once receiving such a packet 20, the terminal stores it, preferably both in the regular media buffer but also in a dedicated memory location. Alternatively, the terminal could be configured for keeping the exit packet 20 in its media buffer also after forwarding the packet content to the decoder or media player.

During the reception and processing of the scene update packets 20, 40, the terminal identifies a rich media packet, in this case scene update packet 45, which was not correctly received or could not be correctly processed. In the prior art, the terminal would need to stop the rendering at the scene update packet preceding this erroneous packet 45 in the stream 1 and stop the rendering until the next complete scene packet 12 is available for rendering.

The technology disclosed herein instead identifies the previously received and stored exit point update packet 20 and uses that packet, preferably the association identifier of the packet 20, for searching for a scene update packet 30 defining an entry point back to rendering rich media packets of the stream 1. The search for this data packet 30 can be among newly received but stored data packets or be among newly received but not yet stored data packets. The scene update packet 30 can be included in the stream 1 as illustrated in the figure or be received on a dedicated error correction channel. In either case, the scene update packet pair 20, 30 defines an alternative route 5 through the stream 1. This means that when the media rendering and possibly the packet decoding reaches the scene update packet 20 defining the exit point, the decoder or media player jumps directly to the scene update packet 30 defining the entry point back to the stream 1. As a consequence, the rich media packets following the exit point defining packet 20 and preceding the entry point defining packet 30 in the stream 1, including the erroneous packet 45 will not be rendered at the media player. The rendering of the rich media then continues as nothing has happened by processing a next rich media packet 44 in the stream 1.

This means that no delay and awaiting a new complete scene packet 12 are necessary according to the technology disclosed herein when a media packet 45 has been incorrectly received. The technology disclosed herein further mitigates the prior art problems reinitiating rendering and reverting back to default settings for the media rendering.

Figures 4A, 4B, 4C, 4D, 4E, 4F, 4G:
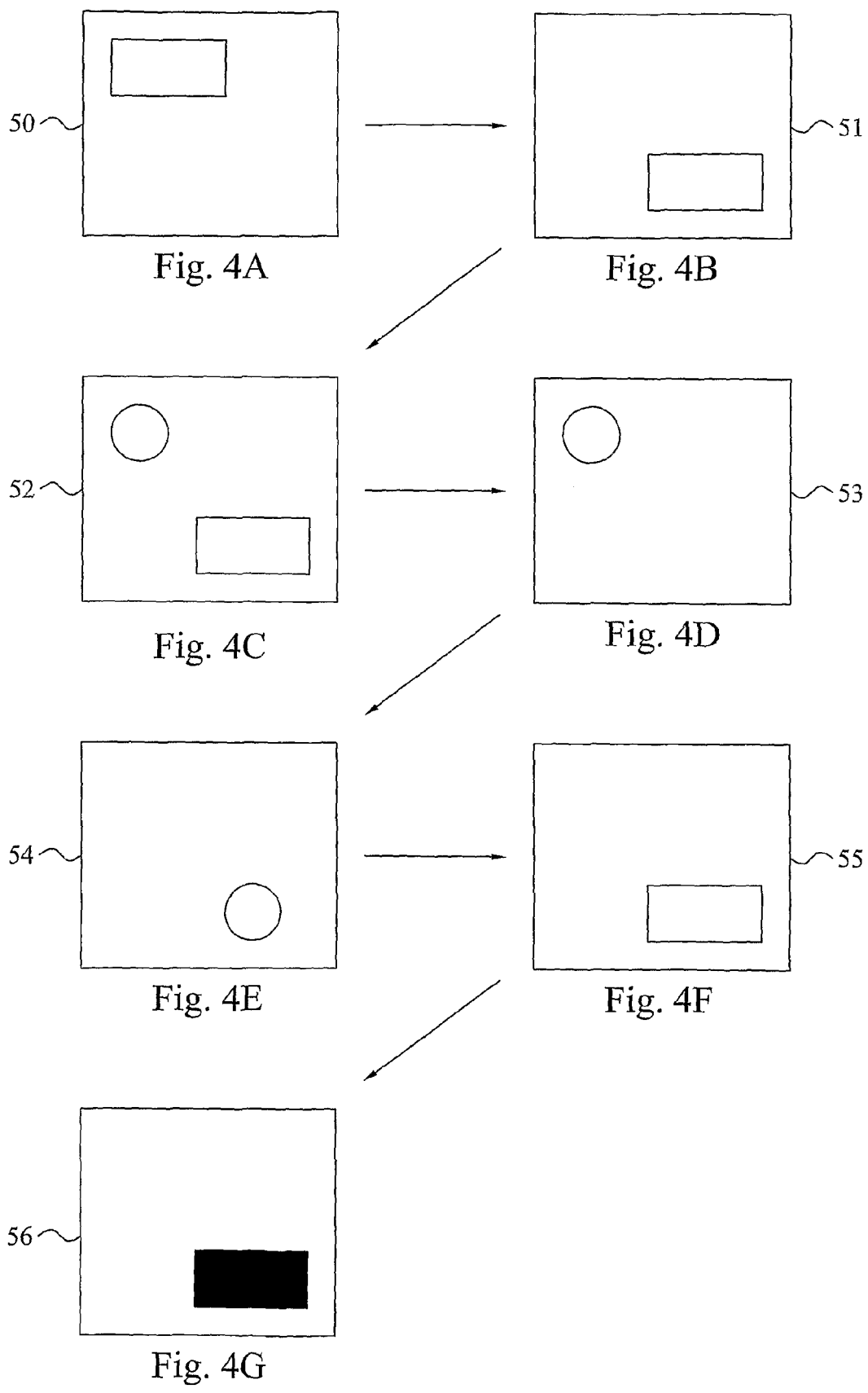
FIGS. 4A to 4G are diagrams schematically illustrating a sequence of rendered rich media scenes.

In a preferred embodiment of the technology disclosed herein a scene obtainable by rendering the exit point defining update packet 20 is identical to or at least near identical to a rendered scene state representable by the entry point scene update packet 30. This is illustrated further in FIGS. 4A to 4G. FIG. 4A illustrates an initial scene 50 with a rectangle element positioned close to the upper left corner. This scene 50 is obtained by rendering a complete scene packet. A first scene update packet defines a modification operation that causes a change in the position of the rectangle in the first updated scene 51 in FIG. 4B. A second update packet could include an insert operation to cause the addition of a circle to form the scene 52 of FIG. 4C. In a next scene 53 of FIG. 4D, a scene update packet comprises a remove operation causing the removal of the rectangle. A next scene update packet has a modification operation that updates the scene 54 by moving the circle as illustrated in FIG. 4E. In the next scene 55, the circle has been replaced by a rectangle in FIG. 4F and finally, the color of the rectangle is changed in the scene 56 of FIG. 4G.

According to the technology disclosed herein, the exit point defining packet could be the scene update packet causing the updating of the initial scene 50 in FIG. 4A to the scene 51 presented in FIG. 4B. The entry point should then be selected to correspond to a scene 55 that is preferably identical to the scene 51 of FIG. 4B or at least close to it. The scene 55 of FIG. 4F fulfills this requirement. As a consequence, the scene update packet causing the transmission from FIG. 4E to FIG. 4F would therefore be an excellent entry point associated with the exit point of FIG. 4B. Thus, if any of the scene update packets causing an update of the scenes in FIGS. 4C to 4E are not correctly received, the rendering of the rich media can proceed from the initial scene 50 of FIG. 4A to the updated scene 51 of FIG. 4B and through the alternative route to FIG. 4F and then to the scene 56 of FIG. 4G. This means that the scenes 52, 53, 54 of FIGS. 4C to 4E will never be rendered. However, they and far less other scenes would have been rendered by employing the error recovery techniques of the prior art.

As is also evident from FIGS. 4A to 4G, for those terminals that did not experience any errors in receiving scene update packets the same scene 55 of FIG. 4F is obtained by going through the normal rendering route of scenes 50-55 in FIGS. 4A to 4F as for those terminals that goes through the alternative route by skipping the scenes 52-54 of FIGS. 4C to 4E.

The embodiment of the technology disclosed herein described above and disclosed in FIG. 2 is typically limited to those streams 1 and scene update packets for which a rendered scene will remerge later in the rich media rendering. However, the technology disclosed herein can in an alternative embodiment generate an arbitrary exit point at an arbitrary place in the stream 1. Such an embodiment is illustrated in FIG. 3.

In FIG. 3, a dedicated exit point defining scene update packet 20 is provided either embedded in the stream 1 or sent on a dedicated error correction channel. This scene update packet 20 will not be rendered at all by a terminal unless one of the following rich media packets 45 was not correctly received. Thus, in the case of no reception errors, the rendering continues from the complete scene packet 10, to a first scene update packet 40, a second scene update packet 42 and so on. However, if an error reception is detected, the terminal uses the previously received and stored exit point packet 20 and applies the scene update operations contained therein to the scene representable by rendering of the first scene update packet 40 and of course the preceding rich media packets 10. The resulting scene is preferably identical to or at least close to the scene obtainable by correctly rendering all rich media packets 10, 40, 42, 45 up to and including the entry point defining packet 30 of the stream 1.

This embodiment provides another level of freedom in defining exit points 20 and alternative routes 5 by being able to include those scene update operations in the exit defining packet 20 that are required to go from the scene obtainable after rendering the first update packet 40 to the scene obtainable after rendering the entry point defining packet 30. Returning briefly to FIGS. 4A to 4G, the scene 51 obtained after rendering the first update packet 40 could be the one illustrated in FIG. 4B. Assume that FIG. 4E illustrates the scene 54 obtainable by rendering all the packets to the entry point packet. In such a case, the exit point packet could include a replace operation in which the rectangle of FIG. 4B is replaced by the circle of FIG. 4E.

An example of a situation in which the scene after the entry point is not identical when going through the normal way in the stream and through the alternative stream could be when the rendered scenes contain a clock. The told time of the clock could be updated by each scene update packet to illustrate the elapse of time. If one would have the embodiment illustrated in FIG. 2, the clock would show the wrong time when going from the exit point to the entry point via the alternative route. The embodiment of FIG. 3 can solve that problem by either removing the clock following the operations in the exit point packet 20 or by setting the correct time to be the time the clock would have when going through the normal route in the stream 1 up to the entry point packet 30. The former solution could still be advantageous as no clock at all is possibly better than a clock telling wrong time.

In the above-described embodiments, a single rendering exit point has a single associated rendering entry point. However, the technology disclosed herein is not limited thereto. In clear contrast an exit point can have multiple, i.e. at least two, associated entry points, multiple different exit points can have a common entry point and the stream can include multiple exit and entry points.

FIG. 5 is a flow diagram illustrating an additional step of the error recovering method of FIG. 1 where an exit point has multiple associated entry points. The method continues from step S5 of FIG. 1. In a next step S10, the user terminal selects, when incorrectly receiving a rich media packet, one of the multiple associated entry points that are available. This selection is preferably performed at least partly based on the particular rich media packet that was not correctly received. In other words the position of that media packet in the stream is used to select a suitable entry point. Generally, the selected entry point provides the first entry point back to rendering rich media packets of the stream following the incorrect media packet. Thus, the entry point is preferably as close as possible in time following the fault point.

In a preferred implementation, the multiple available entry points are preferably all assigned a same association identifier as their associated exit point. The usage of such a common association identifier provides a simple and efficient solution of identifying alternative entry points that are associated with a single, common exit point. The method then continues to step S6 of FIG. 1.

FIG. 6 illustrates this scenario where a scene update packet 20 defining an exit point has multiple, two in the figure, associated scene update packets 30, 32 defining respective entry points back for media rendering and decoding.

If a user terminal did not correctly receive a scene update packet 45 for allowing decoding and rendering thereof, it identifies, preferably based on assigned association identifiers, the exit point defining packet 20, previously received in the stream 1 (or on another channel). The terminal has in this case a choice of using a first entry point defining packet 30 or a second entry point defining packet 32 for determining where the in the stream 1 the rendering should jump to.

By having two entry points, a terminal or different terminals, can use one and the same exit point even though different rich media packets are incorrectly received. For example, if an incorrectly received packet is positioned in the stream 1 after the exit point defining packer 20 but before the scene update packet 44 following the first entry point, the first entry point is typically selected. However, if the error instead occurred or an additional error occurs in a rich media packet following the scene update packet denoted 44 in the figure but before the scene update packet 46 following the second entry point, the second entry point is preferably used.

It is anticipated by the technology disclosed herein that the contents of the two entry point defining packets 30, 32 typically differs as different scene update operations must typically be applied to a scene state achievable by rendering rich media packets 10, 40 up to the exit point defining packet 20 in the stream 1 to get the scene state that would be achieved when correctly rendering rich media packets of the stream 1 up to the first entry point (i.e. up to the scene update packet preceding the packet 44 in FIG. 6) as compared to correctly rendering packets of the stream 1 up to the second entry point (i.e. up to the scene update packet preceding the packet 46).

One or both of the entry point defining packets 30, 32 can be sent in the stream 1 or one or both packets 30, 32 can be sent using one or more other data channels or streams.

Figure 7:
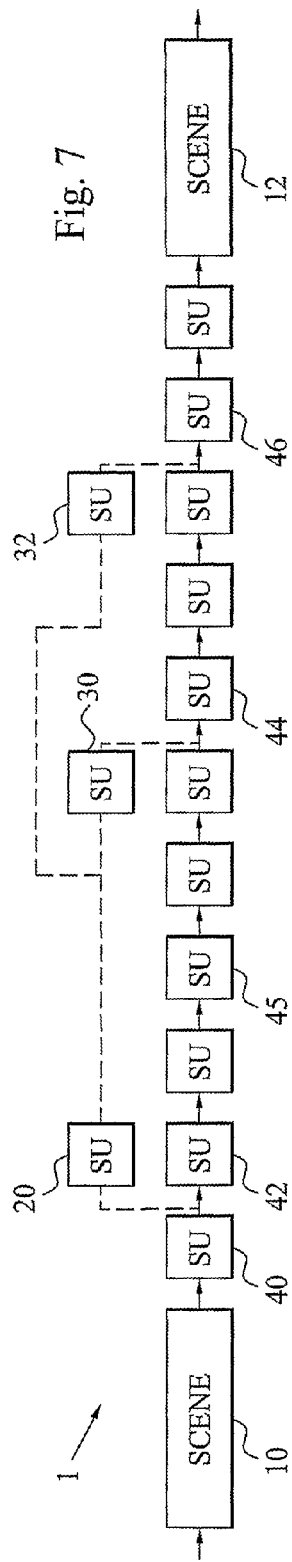
FIG. 7 is a schematic illustration of a portion of a rich media stream provided with recovery point according to yet another embodiment of the technology disclosed herein.

FIG. 7 is a stream embodiment that basically combines the teachings of the streams 1 in FIGS. 3 and 6. As compared to FIG. 6, the exit point defining packet 20 is only rendered by those user terminals that did not correctly receive a rich media packet 45 and is ignored by other terminals. In contrary to FIG. 3, this exit point defining packet 20 has not only one but multiple associated entry point defining packets 30, 32.

This embodiment can be advantageous in the case the rendered scene states all comprise an object that is updated by each and every (or at least almost every) scene update packet, such as a displayed clock. In such a case, the exit point packet 20 could include an operation removing or zeroing the clock. The different entry packets 30, 32 would then add a clock telling the correct time (which of course are different for the two packets 30, 32) or resetting the block.

In the different embodiments described above and disclosed in FIGS. 2, 3, 6 and 7, the exit point defining packet has been in the form of a scene update packet. The technology disclosed herein is, however, not limited thereto but could, for instance, also or instead utilize complete scene packets (RAPs) for defining exit points. It is even possible to instead or in addition use dedicated exit point defining packets that are not regarded as rich media packets for the purpose of the technology disclosed herein.

An exit-entry point pair or group of course becomes out of date and irrelevant once the user terminal has decoded and rendered rich media packets of the stream following the last entry point of the pair or group. However, generally the user terminal has no possibility of determining whether a last entry point defining packet for a previously received exit point packet has been received or not. The terminal could therefore have problems in deciding how long to store a previously received exit point packet, in particular where such exit points can have multiple associated entry points.

This problem can be solved by storing only a last received exit point defining packet of storing the last N received exit point packets, where N is a positive integer. In such a case, the terminal replaces the exit point packets once new such scene update packets are received.

In an alternative or complementary embodiment, each exit point packet has an associated time-to-live value defining for how long that data packet is relevant and should be stored by the terminal. Once a time-to-live value has been exceeded, the relevant exit point packet can be discarded as it is of no relevant use. The time-to-live values are then set so that they will not expire before the last associated entry point packet has been received but should preferably not be so large as to expiry long after the last entry point packet has been received. The content creator is aware of where the different exit and entry points are in the stream and can therefore set the time-to-live values based on the relative positions of these exit and entry points.

The terminal could alternatively or in addition be provided with information allowing identification of the last entry point of a previously received exit point packet. For example, that last entry point packet could be tagged with a special marker identifying it as the last packet of an exit-entry point pair or group. Alternatively, the exit point packet carries information in its header specifying how many associated entry points it has. The terminal can then simply count the different received entry points up to the last before discarding the exit point packet. In a further approach, the content provider can inform the terminal, e.g. at connection with session set-up, of how many associated entry points a given exit point has. This approach is particularly useful in the case all exit points has the same number of entry points but this number could be different for different rich media streams.

FIG. 8 is a flow diagram illustrating a method of generating and providing a rich media packet stream according to the technology disclosed herein. This rich media packet stream comprises data packets carrying rich media scenes and scene updates as previously described. A first step S20 provides the rich media scene packets and scene update packets that form the stream. This step S20 could actually involve recording the media and processing it to form the packets. Alternatively, the "raw" media has been generated elsewhere. In such a case, this step S20 can involve processing that raw media into suitable form, i.e. rich media packets, which can be sent to requesting terminals.

A next step S21 provides, based on at least a portion of the stream, a data packet, preferably a rich media packet and more preferably a scene update packet, defining an exit point for interrupting rendering rich media packets of the stream. This step S21 can involve identifying an exit point defining packet in the stream or provide a separate exit point defining packet that is inserted into the stream or dedicated for transmission using another channel. The step S21 preferably also involves tagging the provided packet to allow identification, by a user terminal, of the packet as a rendering exit point. This tagging is preferably conducted by adding an association identifier to the header of the packet.

The packet provision of step S21 is performed based on at least a portion of the stream. Thus, the exit point packet may be identified in the stream as one packet of a scene update packet pair or group that results in a same or almost similar scene state when rendered (including rendering all previous packets in the stream) by a terminal. This identification can be performed by processing all the rich media or such a feature could be determined by a content creator and signalled together with the rich media. In the case the exit point defining packet is added to the stream or transmitted in some other way, the provision of step S21 preferably selects the scene update operations that should be included in the scene update packet to provide a smooth and seamless entry packet into the stream. This selection can be performed based on a comparison of the scene state of a rich media packet preceding the exit point in the stream and the rich media packet following the entry point. Alternatively, it could be possible to perform the selection based only on the update operations included in the following rich media packet.

A next step S22 provides at least one scene update packet associated with the exit point defining packet and defining an entry point back to rendering rich media packets of the stream and where this entry point is associated with the exit point defined by the data packet provided in step S21.

This entry point defining packet is preferably provided at least partly based on the exit point packet provided in step S21. This means that the second update packet can be identified in stream based on the first scene update packet as the two results in the same or similar scene states. Alternatively, the entry point packet is generated based on at least a portion of the stream so that the rendering of the first scene update packet and the second scene update packet, i.e. via the alternative route, results in a same or at least similar scene state as correctly rendering all rich media packets of the stream up to the entry point.

The provision of step S22 preferably also involves adding an association identifier to the header of the entry point packet, more preferably adding a same association identifier as was added to the associated exit point packet.

In a next step S23 the rich media packets of the stream including the provided exit and entry point defining packets are transmitted to requesting user terminals. The packets can be transmitted to the terminal through unicast file download, broadcast file download or progressive download. Alternatively, the packets are transmitted in the form of unicast, multicast or broadcast streaming to the user terminal(s). Step S23 can involve transmitting at least one of the data packets embedded in the stream and/or transmitting at least one of the data packets using a separate error recovery channel. The method then ends FIG. 9 is a flow diagram illustrating additional steps of the method illustrated in FIG. 8. The method continues from step S20 of FIG. 8. In a next step S30, the media provider receives information of error recovery processing capabilities of a user terminal to which the packet stream is transmitted. This information preferably specifies the number of exit point defining packets the terminal simultaneously can store and/or for how long the terminal will store such a packet. This information can be used in step S31 to determine the frequency of exit and entry points in the stream. Thus, in the case of unicast delivery, where each terminal receives rich media packets on a separate channel, the usage or exit and entry points according to the technology disclosed herein can be adapted to the particular capabilities of the different terminals. For example, in the case a terminal can only store a single exit point packet at a time it might be more advantageous from the terminal's point of view to include frequent exit-entry point pairs or groups. In contrast, if a terminal can simultaneously store multiple previously received exit point defining packets, it could be more advantageous to associate multiple entry points to a single exit point and distribute them more sparsely in the stream.

In addition to using terminal capabilities in step S31, also or instead information of the length between two rich media scene packets (RAPs) can be used to determine the frequency of exit-entry point pairs or groups in the stream. This length is sometimes denoted Group of Pictures (GOP) length in the art. Thus, for shorter GOP lengths less exit and entry points are generally required as compared to rich media streams having long associated GOP lengths. If this GOP length can be dynamically changed during a media session, the frequency of exit-entry points can also be dynamically change to following the updates of GOP lengths.

The method then continues to step S21 of FIG. 9.

FIG. 10 illustrates the concept of adding association identifiers to the exit and entry scene update packets. The method continues from step S22 of FIG. 8. In a next step S40, the exit and entry point packets previously provided are assigned respective association identifiers. Preferably, a same such identifier is assigned to both the exit point defining packet and its associated entry point packets. However, scene update packets belonging to different exit-entry point pairs or groups preferably have different association identifiers. The method then continues to step S23 of FIG. 8.

Figure 11:
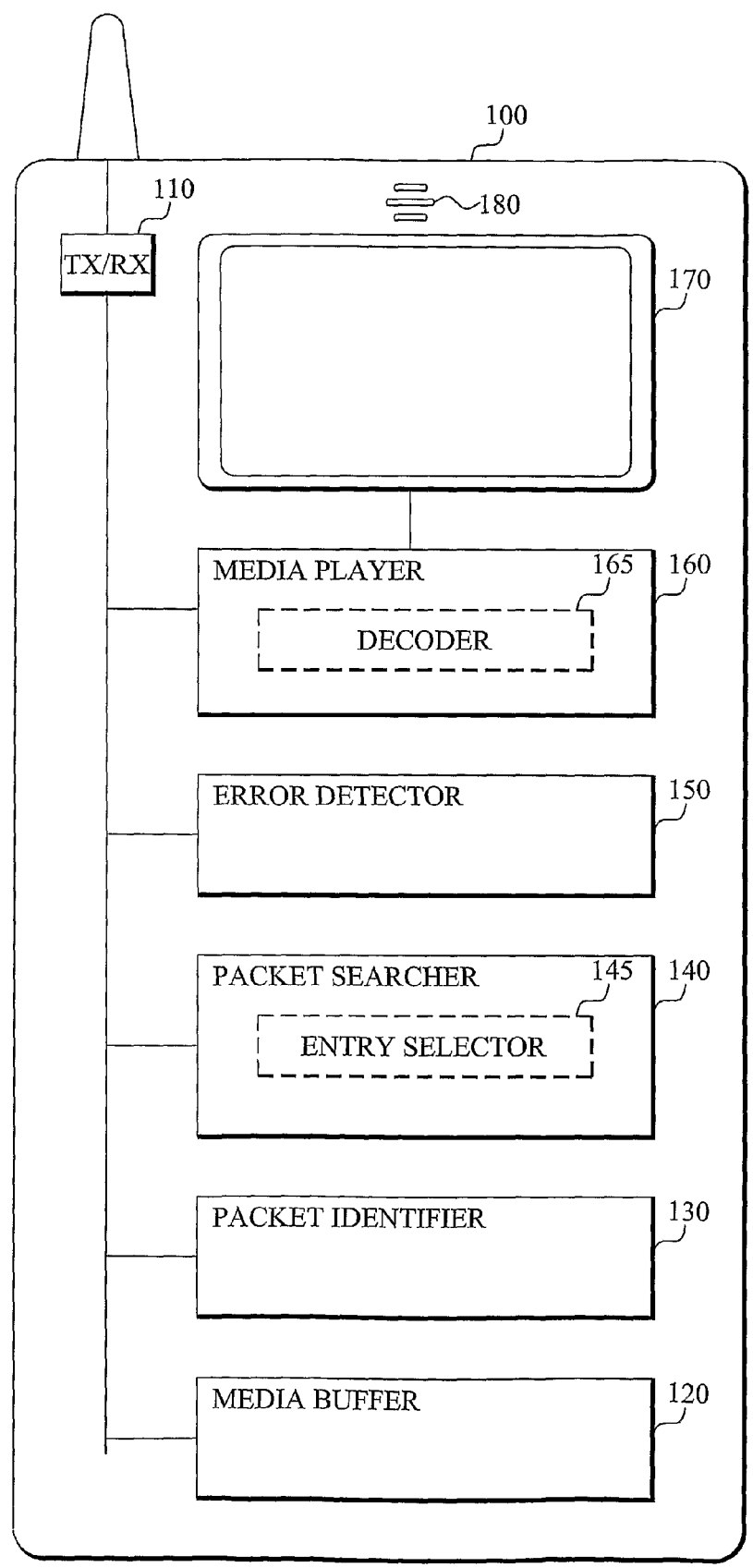
FIG. 11 is a schematic block diagram of a user terminal according to the technology disclosed herein.

FIG. 11 is a schematic block diagram of a user terminal 100 according to the technology disclosed herein. This user terminal 100 comprises a transmitter and receiver or transceiver 110, schematically illustrated as a single unit in the figure. The unit 110 includes traditional transmitter/receiver functionality, such as modulator/demodulator, etc. The receiver part of the unit 110 is in particular adapted for receiving rich media packets of a stream according to the technology disclosed herein.

The terminal 100 also comprises a media buffer 120 for temporarily storing rich media packets of the stream received by the receiver 110. This buffer 120 is mainly employed for combating jitter occurring when transmitting the media packets over a network.

A rich media player 160 is arranged for decoding and rendering rich media fetched from the media buffer 120. The rendered media is displayed on a connected display screen 170 and possibly played on a loudspeaker 180.

An error detector 150 is arranged connected to the receiver 110 and/or a decoder 165 of the media player 160. This detector 150 investigates whether any rich media packet is incorrectly received by the receiver 110 and/or cannot be correctly decoded by the media decoder 165. In such a case, the decoder 150 preferably forwards a packet identification request to a packet identifier 130 arranged in the user terminal 100.

The packet identifier 130 identifies, in the media buffer 120, a data packet previously received by the receiver 110. This data packet defines an exit point causing the media player 160 to temporarily interrupt rendering rich media packets of the stream. The identifier 130 preferably searches through previously received media packets 120 in the buffer until it identifies an exit point defining packet, preferably based on a tag or association identifier included in that packet. In the case of several such exit point defining packets stored in the buffer 120, the identifier 130 preferably identifies and selects the exit point packet that is preceding closest to the incorrectly incorrect rich media packet in the stream to increase the chances that the entry point back to rendering rich media packets associated with the exit point will indeed occur after the incorrect packet in the stream.

Once the packet identifier 130 has identified a suitable exit point defining packet, a packet searcher searches, based on the data packet, for a scene update packet defining an entry point back to rendering rich media packets of the stream. This entry point causes the media player 160 to continue rendering rich media packets of the stream following the entry point.

The packet searcher 140 could search for the entry point defining packet among the rich media packets newly received by the receiver 110. Alternatively, the searcher 140 looks for the packet in the media buffer 120. The packet searcher 140 preferably identifies the entry point defining packet based on an association identifier included in the packet as has been previously described.

If the media buffer 120 comprises or the receiver 110 receives several different entry point defining packets associated with the exit point defining packet identified by the packet identifier 130, an entry selector 145 of the packet searcher 145 can select one of these entry points to use in the present error correction case. The selected entry point packet preferably defines the entry point that occurs closest in time following the incorrect rich media packet to thereby reduce the number of rich media packets that are skipped by rendering through the alternative route defined by the selected exit-entry point pair.

Once the entry point packet has been found, rich media packet are forwarded from the buffer 120 to the media player 160 in such a way that once the exit point is reach in the buffer feed, that exit point defining packet is forwarded to the player 160 followed by the associated entry point defining packet. This means that those rich media packets being between the exit and entry points in the stream, including the incorrect rich media packet, are never rendered by the media player 160 and are preferably never forwarded from the buffer 120. The media packets following the entry point are forwarded to and rendered by the media player 160 as nothing has happened. Thus, this provides a seamless "jump" in the media rendering over an incorrect packet, where this jump does not involve any rendering interruptions and is preferably not noticeable for a viewing user.

The units 110, 130 to 165 of the user terminal 100 may be provided as software, hardware or a combination thereof.

Figure 12:
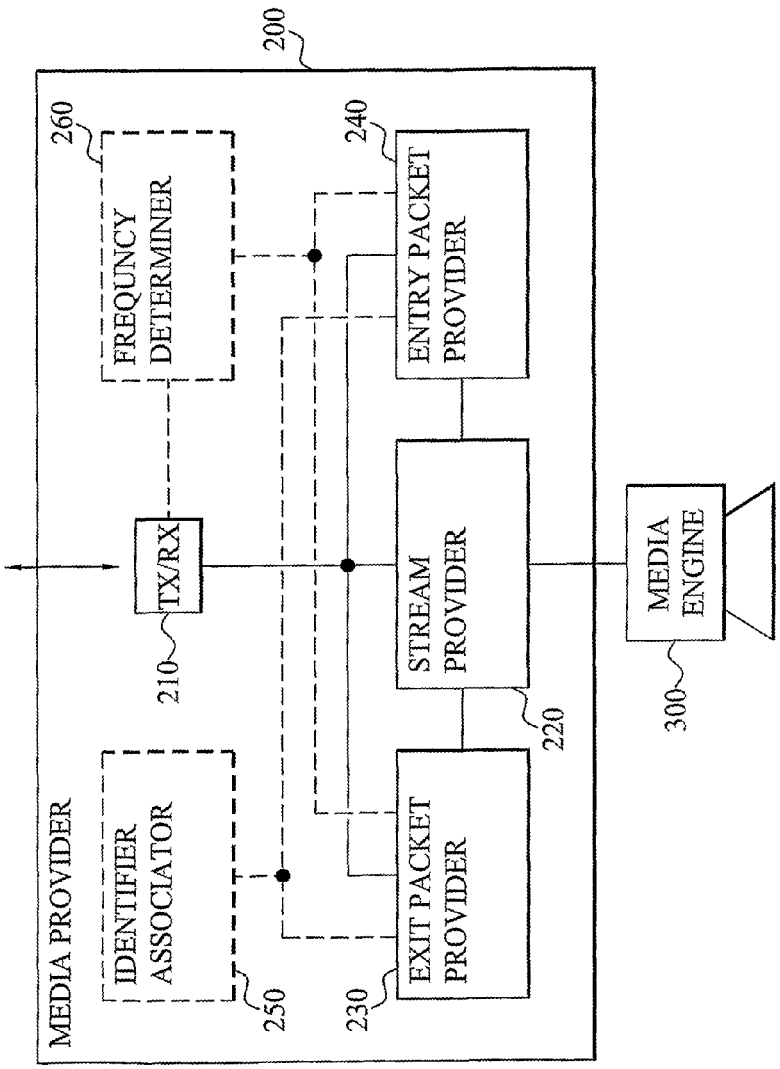
FIG. 12 is a schematic block diagram of a media provider according to the technology disclosed herein.

FIG. 12 is a schematic block diagram of a media provider 200 according to the technology disclosed herein. This media provider 200 comprises a stream provider 220 for providing a stream of rich media scene packets and scene update packets. The provider 220 can receive the rich media from a connected or remote media engine 300. Alternative, the provider 220 itself records or generates the rich media. The stream from the stream provider 220 comprises complete scene packets (RAPs) with intermediate scene update packets as is well known in the art.

An exit packet provider 230 is arranged for providing, based on at least a portion of the stream, a data packet defining an exit point for interrupting rendering rich media packets of the stream. A corresponding entry packet provider 240 is arranged for providing, preferably based on the data packet from the exit provider 230, a scene update packet associated with the exit point defining packet and defining an entry point back to rendering rich media packets of the stream. The exit-entry point pair, thus, defines an alternative route or shortcut a media player can take to combat errors occurring in packet reception or decoding.

Generally, the exit packet provider 230 can provide N exit packets defining N respective exit points for interrupting rich media rendering. Each such exit point defining packet can have $k_N$ associated entry points. In such a case, the entry provider is arranged for providing $$M \leq \sum_N k_N$$

entry packets defining M respective entry points back to rendering rich media. In a typical implementation $$M = \sum_N k_N.$$

However, different exit points can share one or more entry points and in such a case $$M < \sum_N k_N.$$

The number of exit-entry point pairs or groups and the number of entry points associated for the different exit points can be determined by a frequency determiner 260. This determiner 260 preferably uses information of error recovery processing capabilities of a user terminal that will receive the rich media stream from the media provider 200. In such a case, a receiver 210 of the provider 200 receives the terminal capabilities and forwards them to the determiner 260.

An identifier associator 250 is preferably connected to the exit 230 and entry 240 providers for assigning association identifiers to the exit and entry point defining scene update packets as previously described.

Finally, a transmitter of the media provider 210 transmits the provided rich media stream including the exit and entry point packets to requesting user terminals using one or more transmission channels, preferably wireless radio-based channels as discussed in the foregoing.

The units 210 to 260 of the media provider 200 may be provided as software, hardware or a combination thereof. The media provider 200 may be implemented in one or more network nodes of a communication network, preferably a wireless, radio-based network. A distributed embodiment is also possible in which some of the units 210 to 260 are implemented in different network nodes.

It will be understood by a person skilled in the art that various modifications and changes may be made to the technology disclosed herein without departure from the scope thereof, which is defined by the appended claims.

REFERENCES

[1] Scalable Vector Graphics (SVG) Tiny 1.2 Specification—W3C Candidate Recommendation, 10 Aug. 2006
[2] 3GPP S4-AHP255: "MORE Technical Proposal for Dynamic and Interactive Multimedia Scenes (DIMS)"
[3] ISO/IEC 14496-20: "Information technology—Coding of audio-visual objects—Part 20: LASeR (Lightweight Applications Scene Representation)"
[4] IETF RFC 3550: "RTP: A Transport Protocol for Real-Time Applications"
[6] Remote Events for XML (REX) 1.0—W3C Working Draft, 2 Feb. 2006

The invention claimed is:

1. A method of recovering from an error in a stream of rich media packets comprising rich media scenes and scene updates, said method comprising:
identifying a previously received data packet based on an association identifier assigned to said data packet, said data packet defining an exit point for interrupting rendering rich media packets of said stream and having an associated entry point back to rendering rich media packets of said stream;
searching, based on said association identifier assigned to data packet, for a scene update packet defining said entry point back to rendering rich media packets of said stream;
receiving another scene update packet defining another entry point back to rendering rich media packets of said stream;
selecting a selected entry point from the entry point and the another entry point; and
continuing rendering rich media packets of said stream following said selected entry point.

2. The method according to claim 1, wherein said identifying comprises identifying said previously received data packet upon detection of an incorrectly received rich media packet of said stream.

3. The method according to claim 1, further comprising receiving said data packet or said scene update packet in said stream.

4. The method according to claim 1, further comprising receiving said data packet or said scene update packet in a separate error correction channel.

5. The method according to claim 1, wherein said data packet is an exit point defining rich media scene packet or an exit point defining scene update packet.

6. The method according to claim 5, wherein a rendered scene state representable by said data packet being identical to a rendered scene state representable by said second scene update packet.

7. The method according to claim 5, wherein said data packet is an exit point defining scene update packet and said method further comprising updating, based on said data packet, a first rendered scene state obtainable by correctly rendering rich media packets of said stream up to said exit point to form a second scene state, wherein said rendering comprises:
receiving a scene update packet directly following said entry point; and
updating said second scene state based on said scene update packet following said selected entry point.

8. The method according to claim 1, wherein a rendered scene state representable by said scene update packet being identical to a scene state obtainable by correctly rendering rich media packets of said stream up to the rich media packet of said stream directly preceding said selected entry point.

9. The method according to claim 1, further comprising selecting the entry point to correspond to a scene that is essentially identical to a scene at which an exit point occurred.

10. The method according to claim 1, wherein continuing rendering the rich media packets of said stream following said entry point defines an alternative route through the stream which jumps plural scenes of the stream after the exit point so that the jumped plural scenes are not rendered.

11. The method of claim 1, further comprising selecting the selected entry point from the entry point and the another entry point based on the identified data packet and a position of an incorrectly received scene update packet.

12. A method of generating a rich media packet stream comprising rich media scenes and scene updates, said method comprising the steps of:
a) providing rich media scene packets and scene update packets to form said stream;
b) providing, based on at least a portion of said stream, a data packet defining an exit point for interrupting rendering rich media packets of said stream and having an associated entry point back to rendering rich media packets of said stream;
c) assigning an association identifier to said data packet;
d) providing a scene update packet associated with said first scene update packet and defining said entry point back to rendering rich media packets of said stream; and
e) assigning said association identifier to said scene update packet;
f) providing another scene update packet associated with said data packet and defining another entry point back to rendering rich media packets of said stream.

13. The method according to claim 12, further comprising the steps of:
transmitting rich media scene packets and scene update packets of said stream; and
transmitting said data packet and said scene update packet.

14. The method according to claim 13, wherein said transmitting said data packet and said scene update packet comprises transmitting said data packet or said scene update packet using a separate error recovery channel.

15. The method according to claim 13, wherein said transmitting said data packet and said scene update packet comprises transmitting said data packet or said scene update packet embedded in said stream.

16. The method according to claim 12, wherein said providing step d) comprises providing said scene update packet based on said data packet.

17. The method according to claim 12, wherein said steps d) and f) collectively comprise providing, based on at least a portion of said packet stream, N data packets defining N respective exit points for interrupting rendering rich media packets of said stream, each first scene update packet having $k_N$ associated entry points back to rendering rich media packets of said stream, each $k_N$ being a positive integer, and said providing step c) comprises providing $$M \le \sum_N k_N$$

scene update packets defining M respective entry points back to rendering rich media packets of said stream.

18. The method according to claim 17, further comprising the steps of:
receiving information of error recovery processing capability of a user terminal to which said rich media packets of said stream are transmitted; and
determining at least one of the numbers M and N based on said error recovery processing capability.

19. The method according to claim 12, further comprising selecting the entry point to correspond to a scene that is essentially identical to a scene at which an exit point may occur.

20. The method according to claim 12, wherein providing the scene update packet associated with the first scene update packet defines an alternative route through the stream which jumps plural scenes of the stream after the exit point so that the jumped plural scenes are not rendered.

21. The method of claim 12, further comprising selecting a selected entry point from the entry point and the another entry point.

22. A user terminal comprising:
a receiver for receiving rich media packets of a stream comprising rich media scenes and scene updates;
a buffer for temporarily storing rich media packets received by said receiver;
a rich media player for rendering rich media stored in said buffer;
a packet identifier for identifying, in said buffer, a data packet previously received by said receiver based on an association identifier assigned to said data packet, said data packet defining an exit point causing said rich media player to interrupt rendering rich media packets of said stream and having an associated entry point back to rendering rich media packets of said stream; and
a packet searcher for searching, based on said association identifier assigned to said data packet identified by said packet identifier, for a scene update packet defining said entry point back to rendering rich media packets of said stream, said rich media player is adapted for continuing rendering rich media packets of said stream following said entry point;
said receiver also being arranged to receive another scene update packet defining another entry point back to rendering rich media packets of said stream;
an entry point selector for selecting a selected entry point between the entry point and said another entry point.

23. The user terminal according to claim 22, further comprising an error detector for detecting rich media packets incorrectly received by said receiver, wherein said packet identifier is adapted for identifying said data packet upon on said detector detecting a rich media packet of said stream incorrectly received by said receiver.

24. The user terminal according to claim 23, wherein said packet searcher is adapted for searching, based on said data packet identified by said packet identifier, for said scene update packet among rich media packets received by said receiver following reception of said incorrectly received update packet.

25. The user terminal according to claim 22, wherein the entry point is selected to correspond to a scene that is essentially identical to a scene at which an exit point occurred.

26. The user terminal according to claim 22, wherein the packet searcher upon locating the entry point provides an alternative route through the stream which jumps plural scenes of the stream after the exit point so that the jumped plural scenes are not rendered.

27. The user terminal of claim 22, wherein the entry point selector is arranged to select the selected entry point from the entry point and the another entry point based on the identified data packet and a position of an incorrectly received scene update packet.

28. A node of a communications network comprising:
a stream provider for providing a rich media packet stream comprising rich media scene packets and scene update packets to form said stream;
an exit provider for providing, based on at least a portion of said stream, a data packet defining an exit point for interrupting rendering rich media packets of said stream and having an associated entry point back to rendering rich media packets of said stream;
an entry provider for providing a scene update packet associated with said data packet and defining said entry point back to rendering rich media packets of said stream; and
associating means for i) assigning an association identifier to said data packet, and ii) assigning said association identifier to said scene update packet; and
wherein said entry provider is arranged for providing another scene update packet associated with said data packet and defining another entry point back to rendering rich media packets of said stream;
wherein the stream provider, the exit provider, the entry provider, and the associating means each comprise hardware or a combination of hardware and software.

29. The node according to claim 28, further comprising a transmitter for i) transmitting rich media scene packets and scene update packets of said stream, and ii) transmitting said data packet and said scene update packet.

30. The node according to claim 28, wherein said entry provider is arranged for providing said scene update packet based on said data packet provided by said exit provider.

31. The node according to claim 28, wherein said exit provider is arranged for providing, based on at least a portion of said packet stream, N data packets defining N respective exit points for interrupting rendering rich media packets of said stream, each first scene update packet having $k_N$ associated entry points back to rendering rich media packets of said stream, each $k_N$ being a positive integer, and said entry provider is arranged for providing $$M \le \sum_N k_N$$

scene update packets defining M respective entry points back to rendering rich media packets of said stream.

32. The node according to claim 31, further comprising:
a receiver for receiving information of error recovery processing capability of a user terminal to which a transmitter transmits said rich media packets of said stream; and
means for determining at least one of the numbers M and N based on said error recovery processing capability.

33. The node according to claim 28, wherein the entry point is selected to correspond to a scene that is essentially identical to a scene at which an exit point occurred.

34. The node according to claim 28, wherein the entry provider provides an alternative route through the stream which jumps plural scenes of the stream after the exit point so that the jumped plural scenes are not rendered.

35. The node of claim 28, further comprising a selector arranged to select a selected entry point from the entry point and the another entry point.

36. A node of a communications network comprising hardware configured to provide a rich media packet stream comprising rich media scene packets and scene update packets, wherein said stream comprises:
- a data packet defining an exit point for interrupting rendering rich media packets of said stream and having an associated entry point back to rendering rich media packets of said stream, said data packet comprising an assigned association identifier; and
- plural scene update packets defining respective plural entry points back to rendering rich media packets of said stream, said scene update packets comprising said assigned association identifier.

37. The node according to claim 36, wherein the entry point is selected to correspond to a scene that is essentially identical to a scene at which an exit point may occur.

38. The node according to claim 36, wherein the scene update packet defines an alternative route through the stream which jumps plural scenes of the stream after the exit point so that the jumped plural scenes are not rendered.

* * * * *

UNITED STATES PATENT AND TRADEMARK OFFICE
CERTIFICATE OF CORRECTION

| | | |
|---|---|---|
| PATENT NO. | : 8,578,228 B2 | Page 1 of 2 |
| APPLICATION NO. | : 12/305301 | |
| DATED | : November 5, 2013 | |
| INVENTOR(S) | : Frojdh et al. | |

It is certified that error appears in the above-identified patent and that said Letters Patent is hereby corrected as shown below:

On the title page, item (73), under "Assignee", in Column 1, Line 1,
delete "Ericcson," and insert -- Ericsson (publ), --, therefor.

On title page 2, item (56), References Cited under "OTHER PUBLICATIONS", in Column 1,
Line 10, delete "et al," and insert -- et al., --, therefor at each occurrence throughout the
Other Publications.

On title page 2, item (56), References Cited under "OTHER PUBLICATIONS", in Column 2,
Line 36, delete "Pictureexpert" and insert -- Picture expert --, therefor.

On title page 2, item (56), References Cited under "OTHER PUBLICATIONS", in Column 2,
Line 39, delete "IEEEE" and insert -- IEEE --, therefor.

In the Drawings

In Fig. 9, Sheet 4 of 6, for Tag "S31", in Line 2, delete "FREQUENCE" and
insert -- FREQUENCY --, therefor.

In Fig. 12, Sheet 5 of 6, for Tag "260", in Line 1, delete "FREQUNCY" and
insert -- FREQUENCY --, therefor.

In the Specification

Column 3, Line 5, insert Heading -- SHORT DESCRIPTION OF THE DRAWINGS --, therefor.

Column 5, Line 37, delete "3GP file." and insert -- 3GPP file. --, therefor.

Signed and Sealed this
Fifteenth Day of July, 2014

Michelle K. Lee
*Deputy Director of the United States Patent and Trademark Office*

CERTIFICATE OF CORRECTION (continued)
U.S. Pat. No. 8,578,228 B2

Column 9, Line 45, delete "packer 20" and insert -- packet 20 --, therefor.

Column 12, Line 5, delete "ends" and insert -- ends. --, therefor.

Column 13, Line 41, delete "searcher 145" and insert -- searcher 140 --, therefor.

Column 14, Line 58, delete "provider 210" and insert -- provider 200 --, therefor.

In the Claims

Column 17, Line 56, in Claim 23, delete "upon on" and insert -- upon --, therefor.